Henry P. Kynett. Impd. Cultivator.

117547

PATENTED AUG 1 1871

Witnesses.
Gilbert R. Fowler.
H. L. Perrine.

Inventor:
H. P. Kynett
By W. Burris
Atty

UNITED STATES PATENT OFFICE.

HENRY P. KYNETT, OF LISBON, IOWA.

IMPROVEMENT IN CULTIVATORS.

Specification forming part of Letters Patent No. 117,547, dated August 1, 1871.

*To all whom it may concern:*

Be it known that I, HENRY P. KYNETT, of Lisbon, Linn county, Iowa, have invented a new and useful Improvement in Cultivators, which is fully described in the following specification and accompanying drawing, in the different figures of which like letters represent like parts, and in which—

Figure 1:
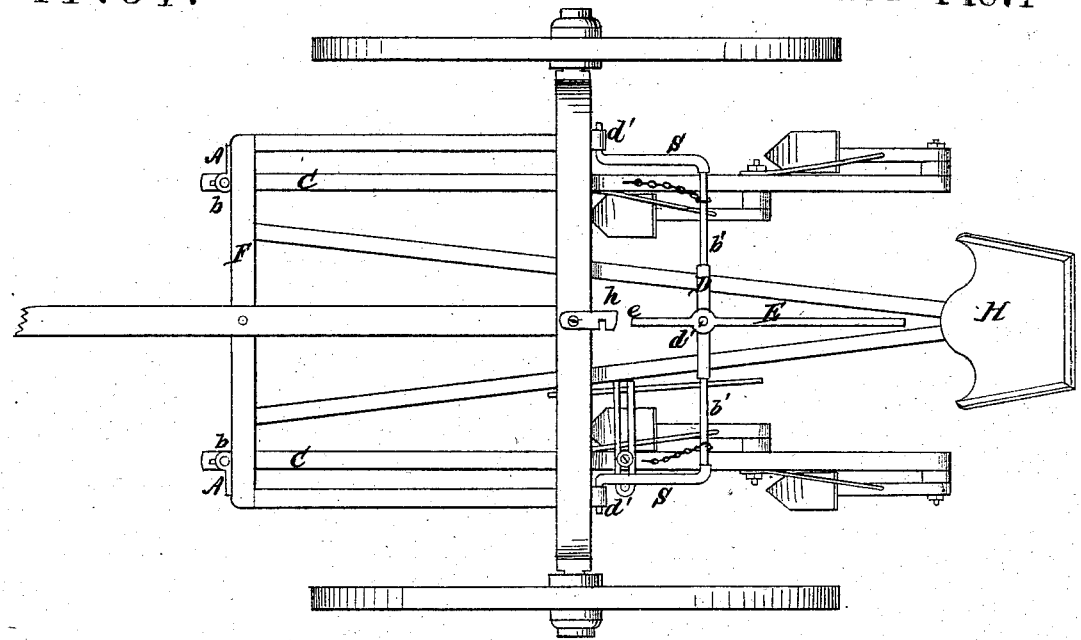
Figure 2:
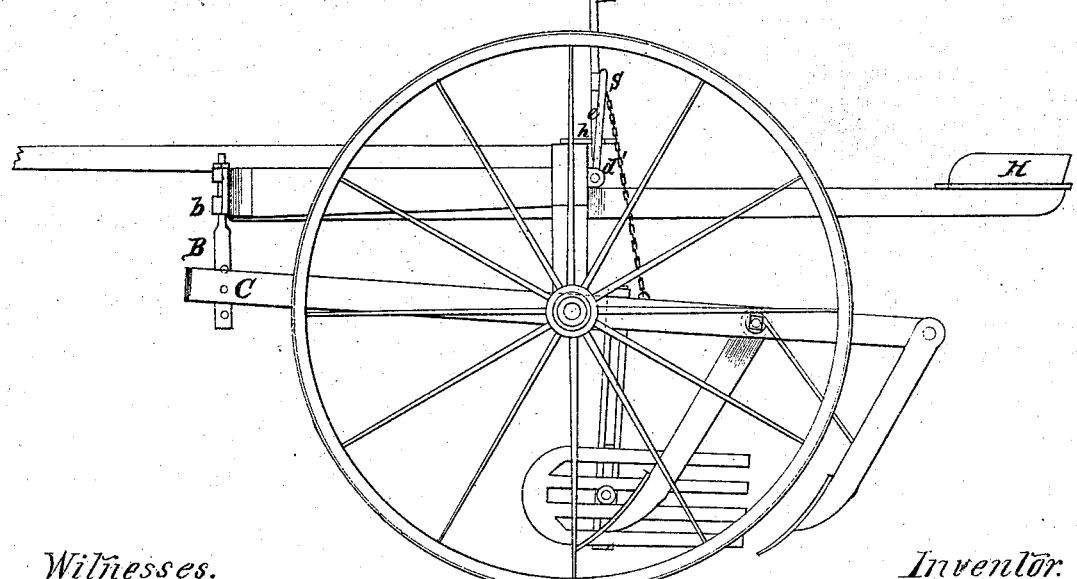
Figure 3:
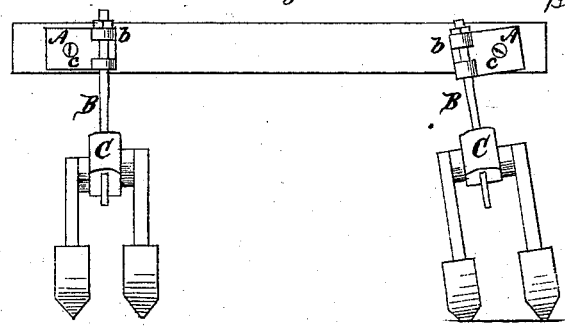

Figure 1 is a top view, Fig. 2 is a side view, and Fig. 3 is a front view of the devices for attaching the front ends of the cultivator-beams.

My invention relates to a riding-cultivator; and consists: First, of the devices for attaching the front ends of the cultivator-beams to the frame, so as to allow the cultivators to have a rocking and swinging movement, consisting of a plate, provided with a hinge, attached to the frame by a pivot-bolt. Second, of the devices for raising and lowering the cultivators, and operating them laterally, consisting of a movable bar with a lever, to which bar are attached supporting-chains by sliding hooks or rings, and a catch to hold the lever in an upright position to suspend the cultivators above the surface of the ground.

A A represent plates provided with hinges, B B, attached to the front side of the frame F, by pivot-bolts or screws C C. B B are support swivel standards, the upper ends of which are made to work loosely in the hinge-sockets, and are supported by a rivet-head or screw and nut, and the lower ends are inserted through mortises in the ends of the beams C C, and held by bolts through the holes in the standards. D is a movable bar, provided with a lever, E, attached to the bar by a pivot-bolt, $d$, the forward end $e$ projecting beyond the bar sufficiently to fasten in catch $h$ when raised to suspend the cultivators, as shown in Fig. 2. Those parts of the bar marked B' B' are made straight and round to allow the hooks or rings connecting with supporting-chains to slide back and forth to facilitate the lateral movements of the cultivators, and the ends of the bar are shaped to work loosely in the eyes $d'$ $d'$ like a hinge, and to form the end arms or standards S S, as seen in Figs. 1 and 2. H represents the seat, arranged in the rear of the cultivators so as to afford the operator a better view of his work than when the seat is further forward.

I claim—

1. In a cultivator, the devices for attaching the front of the beams to the frame, consisting of plates A, with hinges B, screw-bolt $c$, and support swivel-standard B, substantially as described.

2. The devices for raising and lowering the cultivators and allowing them to have the required lateral movements, consisting of the bar D, lever F $e$, and catch $h$, all constructed and arranged substantially as described.

In attestation of the specification of my improved cultivator I hereto subscribe my name this 5th day of May, 1871.

H. P. KYNETT.

Witnesses:
JOHN E. KURTZ,
JAC. BITTINGER.